(12) United States Patent  (10) Patent No.: US 7,523,449 B2
Asaad et al.  (45) Date of Patent: Apr. 21, 2009

(54) SYSTEM AND METHOD FOR ADAPTIVE RUN-TIME RECONFIGURATION FOR A RECONFIGURABLE INSTRUCTION SET CO-PROCESSOR ARCHITECTURE

(75) Inventors: Sameh W. Asaad, Briarcliff Manor, NY (US); Richard Gerard Hofmann, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 11/508,714

(22) Filed: Aug. 23, 2006

(65) Prior Publication Data

US 2006/0288191 A1  Dec. 21, 2006

Related U.S. Application Data

(63) Continuation of application No. 10/881,147, filed on Jun. 30, 2004.

(51) Int. Cl.
*G06F 9/45* (2006.01)
*G06F 9/44* (2006.01)
*G06F 15/00* (2006.01)
*G06F 7/38* (2006.01)
*G06F 12/00* (2006.01)

(52) U.S. Cl. .................. 717/161; 717/121; 712/34; 712/225; 710/340

(58) Field of Classification Search .................. None
See application file for complete search history.

(56) References Cited

U.S. PATENT DOCUMENTS

| 6,002,881 | A  | * | 12/1999 | York et al. | 712/34 |
| 6,209,087 | B1 | * | 3/2001 | Cashman et al. | 712/300 |
| 6,507,898 | B1 | * | 1/2003 | Gibson et al. | 711/168 |
| 2002/0013872 | A1 | * | 1/2002 | Yamada | 710/240 |
| 2005/0038978 | A1 | * | 2/2005 | Nickolls et al. | 712/209 |

* cited by examiner

*Primary Examiner*—Tuan Q Dam
*Assistant Examiner*—Isaac T Tecklu
(74) *Attorney, Agent, or Firm*—F. Chau & Associates, LLC

(57) ABSTRACT

A method for adaptive runtime reconfiguration of a co-processor instruction set, in a computer system with at least a main processor communicatively connected to at least one reconfigurable co-processor, includes the steps of configuring the co-processor to implement an instruction set comprising one or more co-processor instructions, issuing a co-processor instruction to the co-processor, and determining whether the instruction is implemented in the co-processor. For an instruction not implemented in the co-processor instruction set, raising a stall signal to delay the main processor, determining whether there is enough space in the co-processor for the non-implemented instruction, and if there is enough space for said instruction, reconfiguring the instruction set of the co-processor by adding the non-implemented instruction to the co-processor instruction set. The stall signal is cleared and the instruction is executed.

1 Claim, 4 Drawing Sheets

Reconfigurable co-processor interface

Reconfigurable co-processor interface

Partitioning of co-processor fabric into tiles

FIG. 3 Processor Flowchart

Fast Reconfiguration Co-processor Flowchart

Slow Reconfiguration Co-processor Flowchart

SYSTEM AND METHOD FOR ADAPTIVE RUN-TIME RECONFIGURATION FOR A RECONFIGURABLE INSTRUCTION SET CO-PROCESSOR ARCHITECTURE

CROSS REFERENCE TO RELATED UNITED STATES APPLICATIONS

This application is a continuation of, and claims priority from, U.S. patent application Ser. No. 10/881,147, filed on Jun. 30, 2004 of Asaad, et al., the contents of which are incorporated herein in their entirety.

FIELD OF THE INVENTION

This invention is directed to programmable and reconfigurable microprocessor architectures, such as field programmable gate array (FPGA) architectures.

BACKGROUND OF THE INVENTION

There is a growing trend to deploy programmable microprocessors in system designs where traditionally fixed function integrated circuits were used. This is mainly driven by the flexibility of software compared to hardwired solutions.

For a given application domain, however, the general purpose instruction set of the processor might not deliver sufficient computational performance to tackle the problem.

To overcome this limitation, dedicated co-processors are used in conjunction with the general purpose microprocessor to accelerate domain specific tasks, such as signal processing and streaming application tasks. From a programming perspective, the co-processor appears as one or more instructions that perform the domain specific functions.

This solution, however, limits the suitability of the system to the domains that have been foreseen at design-time and thus included in the capabilities of the co-processor. After production, the chip might not perform well if re-targeted to a different domain, thus loosing some of the advantages as a general purpose processor.

SUMMARY OF THE INVENTION

To remedy this shortfall, a reconfigurable co-processor system is provided that includes a general purpose microprocessor coupled to a reconfigurable fabric, e.g. an embedded FPGA fabric, such that domain specific instructions can be implemented onto the reconfigurable fabric. The general purpose processor handles instruction fetch, decode and execution of all original instructions. Moreover, it handles fetch, partial decode and forwarding of co-processor instructions to the reconfigurable co-processor along with associated data. In addition, the co-processor can be reconfigured at run-time, allowing the system to automatically adapt to varying program requirements. This enables the programmer or domain specialist to add the appropriate instructions to perform different tasks so as to increase the overall performance of the application in the most efficient manner.

One or more domain specific instructions can be implemented in the reconfigurable co-processor. In cases where the physical size of the co-processor fabric is not large enough to implement all desired instructions, the co-processor can be reconfigured on-the-fly to handle the requested instruction. Several scenarios are possible, depending on the speed of reconfiguration, the performance criticality of the instruction and the overhead of implementing the functionality in software.

DETAILED DESCRIPTION OF THE INVENTION

Figure 1:
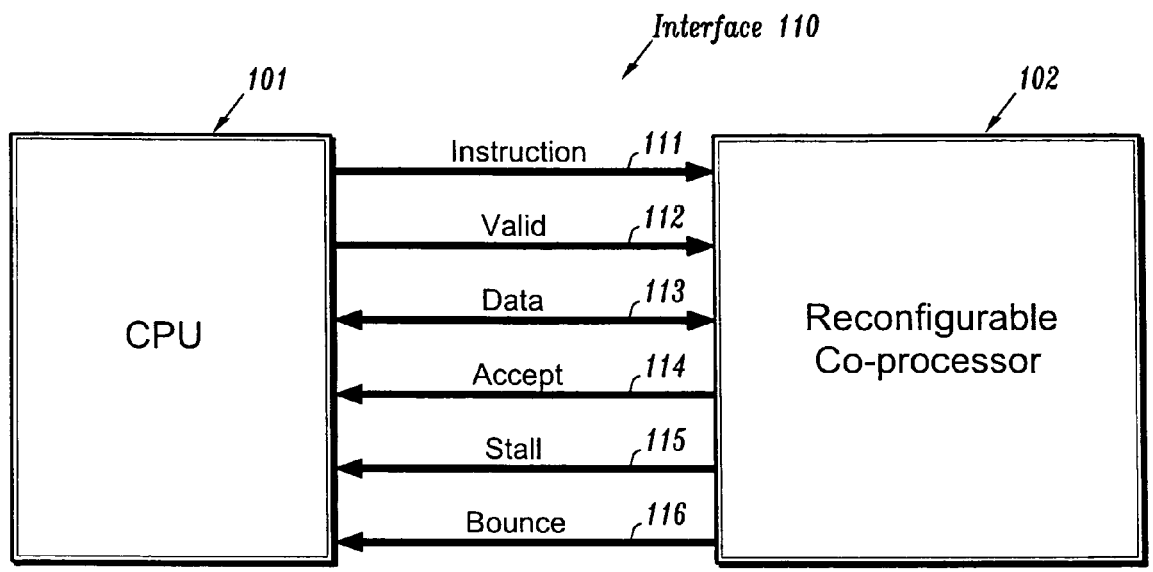
FIG. 1 is a block diagram depicting the interface between a microprocessor and the reconfigurable co-processor of the invention.

A typical interface between a main processor and a co-processor is shown in FIG. 1. Depicted in FIG. 1 is a main processor 101, a reconfigurable co-processor of the invention 102, and a co-processor interface 110 over which a plurality of signals can be exchanged between the processors. The main processor can be, for example, a central processing unit of a personal computer. The instruction signal 111 is an actual instruction being sent from the processor 101 to the co-processor. Processor 101 uses the valid signal 112 to tell the co-processor 102 that the current instruction on the instruction bus is intended for execution by the co-processor 102. The accept signal 114 is used by the co-processor 102 to tell the main processor 101 that it can execute the instruction 111. The co-processor 102 can optionally assert the stall signal 115 to indicate to the main processor 101 that it accepts the instruction 111 but needs extra cycles to handle it. The co-processor 102 uses the bounce signal 116 to indicate to the main processor 101 that it is unable to execute the requested instruction. The data signal 113 can represent any data operands needed by the co-processor 102 in order to execute the instruction 111, or can represent an instruction result being returned by the coprocessor 102 to the main processor 101.

Co-processor Instruction Design

A co-processor instruction is implemented by specifying, in a file or byte stream, the configuration of all functions, gates, and connections in a particular region of the co-processor. This specification defines a circuit in the co-processor that will execute the instruction. The process of downloading the instruction implementation to the target region of the co-processor is referred to as mapping the instruction to the co-processor.

Figure 2:
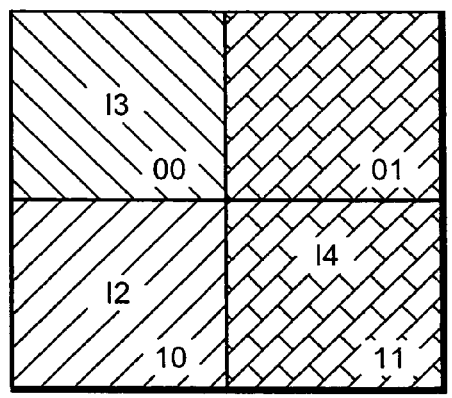
FIG. 2 depicts the mapping of co-processor instructions onto co-processor tiles.

The co-processor fabric can be physically or logically partitioned into multiple regions, referred to as tiles. A tile is the smallest unit of hardware resources of the co-processor fabric onto which an instruction can be mapped. In other words, an instruction can occupy one or more tiles when mapped onto the co-processor fabric. FIG. 2 illustrates this concept, where instruction I3 occupies tile 00, instruction I2 occupies tile 10, and instruction I4 occupies tiles 01 and 11.

Prior to run-time, all reconfigurable co-processor instructions must be implemented and ready to be mapped onto the target configurable fabric. This way we guarantee the timely and efficient reconfiguration of the co-processor during system operation. Each instruction shall have at least one implementation option. Any instruction can have multiple implementations so that it can map to different regions in the target fabric, or to accommodate a trade-off between area (in number of tiles) and implementation performance.

The designer can choose to lock one or more instructions in the co-processor. The lock prevents the corresponding instruction from participating in the reconfiguration process and guarantees that the instruction will always remain in the co-processor. The lock may be set or removed at run-time under software control.

Execution Scenarios

Figure 3:
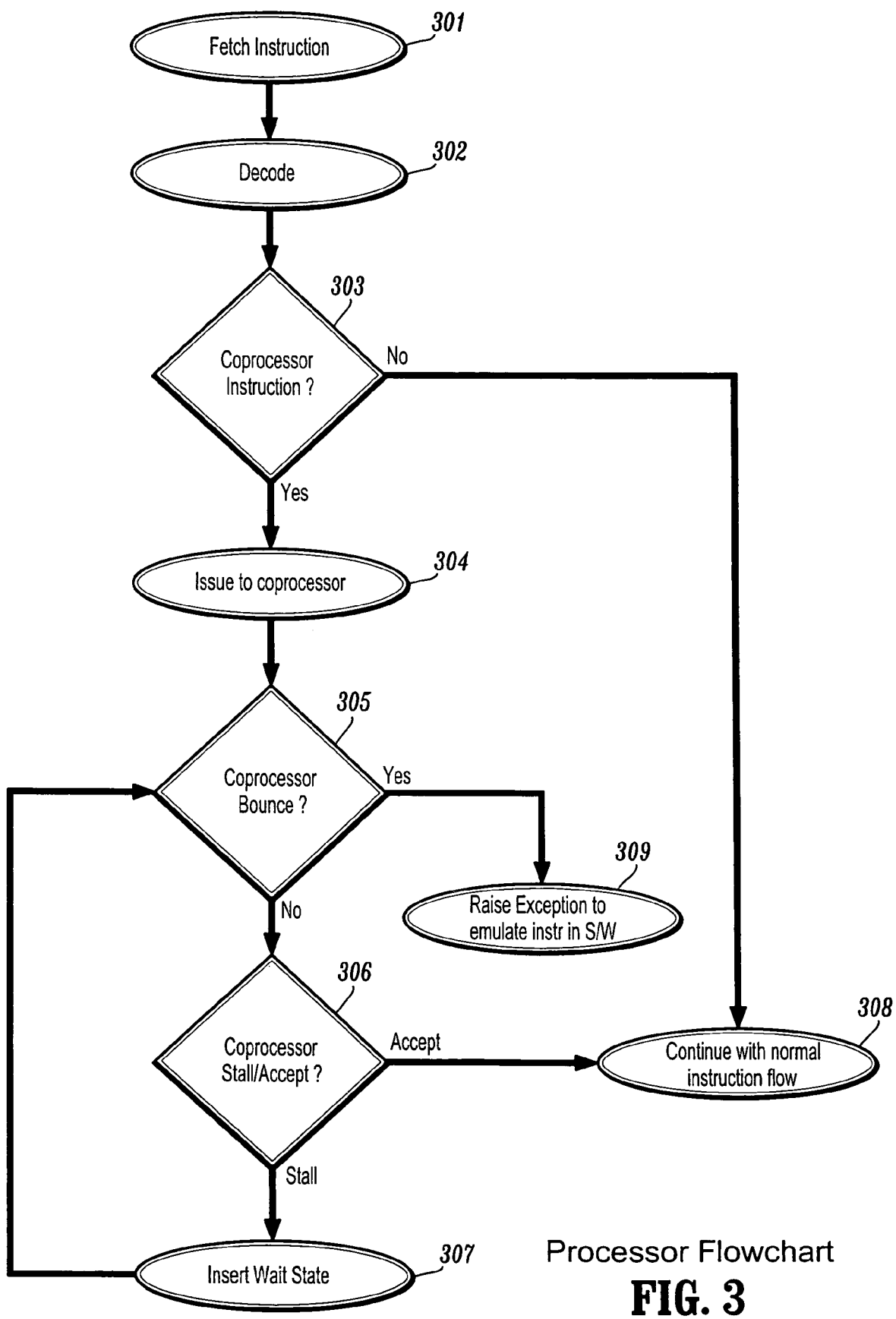
FIG. 3 depicts a flowchart illustrating the basic steps of the basic instruction execution process of the invention.

With the above architecture in mind, a typical program execution will contain instructions belonging to the original instruction set of the general purpose microprocessor as well as one or more domain specific instructions that are added for a certain application or domain. The basic instruction execution process of the main processor 101 and the co-processor 102 is illustrated in the flow chart of FIG. 3. The main processor fetches an instruction at step 301. At step 302, the main processor at least partially decodes the instruction in order to determine which processor is to execute the instruction. At step 303, if the main processor 101 finds that an instruction belongs to the co-processor 102, it issues that instruction 111 at step 304 on the co-processor interface and asserts the valid signal 112. On the other hand, if it is determined that the instruction is not a co-processor instruction, the main processor will continue with the execution of the instruction at step 308.

At step 305, the co-processor determines whether the requested instruction is mapped to the reconfigurable co-processor. The following execution scenarios are possible. If the instruction is currently mapped, the co-processor, at step 306, accepts the instruction, issues an accept signal 114 and determines whether additional cycles are needed to fulfill the request (e.g. the reconfigurable co-processor is slower than the main processor or the instruction complexity resulted in a slow implementation on the reconfigurable fabric). If additional cycles are needed, the co-processor raises the stall signal 115 so that the main processor can insert a wait state at step 307.

If the requested instruction is currently not mapped in the reconfigurable co-processor, e.g. due to a previous reconfiguration, the co-processor can, at step 309, perform one of the following actions:
1. Raise the stall signal 115 to delay the main processor until the co-processor is reconfigured to map the requested instruction.
2. Raise the bounce signal 116 to tell the main processor that this instruction cannot be executed at this time. The main processor can handle this case by raising an exception and letting the exception handler emulate the instruction execution in software.
3. Same as "2" but also initiating a reconfiguration cycle in anticipation of the next time the same instruction will be requested.

The situation in which a valid co-processor instruction issues where the instruction is currently not mapped to the co-processor is referred to as a co-processor instruction miss.

Reconfiguration Strategies

The decision of what to do when the reconfigurable co-processor receives an instruction that is currently not mapped depends on many factors, such as:
1. Speed of Reconfiguration: How fast can run-time reconfiguration be carried out in relation to cycle time of the processor.
2. Instruction Frequency: How frequent is execution of the instruction in question.
3. Cost of software implementation: What is the cost associated with emulating the instruction in software.
4. Current utilization of co-processor resources: If there are other instructions currently resident in the co-processor, will the new instruction have to replace one or more of them? What is the cost of loosing the current resident instruction(s)?

To aid in this decision, one preferred embodiment of the proposed system includes performance counters. One performance counter is assigned to each of the co-processor instructions. For each instruction, the counter tracks the following events:
1. Mapping the corresponding instruction to the co-processor.
2. Removing the corresponding instruction from the co-processor.
3. Issuing a valid co-processor instruction targeted for the corresponding mapped instruction.
4. Issuing a valid co-processor instruction targeted for a different mapped instruction.
5. Missing a co-processor instruction.

For a given co-processor instruction, the associated performance counter initially holds the value 0. When the instruction gets mapped onto the co-processor, the counter is re-initialized with an initial non-zero value. Every time a valid co-processor instruction is issued targeting a different instruction, the counter for the given instruction is decremented by a programmable decrement step such that it doesn't fall below 0. Every time a valid co-processor instruction is issued targeting this instruction when mapped to the co-processor, the counter is restored to the initial non-zero value. Every time a miss event for the instruction occurs, the performance counter associated with the missed instruction is incremented by a programmable increment step. This way, the co-processor instructions are ordered in recent usage, where instructions with higher counter value are more recently used than ones with lower or zero counter value. If the instruction gets unmapped, its performance counter is reset to 0.

The performance counter, initial value, decrement step and increment step for each instruction are all hardware based counters/registers that are accessible by software. One possible hardware configuration is illustrated by the following table.

| Co-Processor Instr1 | Counter1 | Init_value1 | Increment_val1 | Decrement_val1 |
| --- | --- | --- | --- | --- |
| Co-Processor Instr2 | Counter2 | Init_value2 | Increment_val2 | Decrement_val2 |
| ... | ... | ... | ... | ... |
| Co-Processor InstrN | CounterN | Init_valueN | Increment_valN | Decrement_valN |

These counters/registers can have different values for different co-processor instructions, and can be modified by the user.

A re-configuration is triggered when any of the following conditions are met:
1. A co-processor miss occurs and there are enough unused resources in the co-processor to map the requested instruction.
2. A co-processor miss occurs and the performance counter value of the missed instruction exceeds that of a mapped, unlocked instruction of equal or larger size.
3. A co-processor miss occurs and the performance counter value of the missed instruction exceeds the sum of all mapped, unlocked instructions that will be evicted to free enough co-processor resources to accommodate the new instruction.
4. A change in the locking state of the mapped instructions occurs, leading to re-evaluation of the performance counter values of the mapped versus non-mapped instructions.

By using the performance counters, the system can automatically adapt to various phases of program execution where in each phase a subset of domain specific instructions is used more frequently than the rest.

Figure 4:
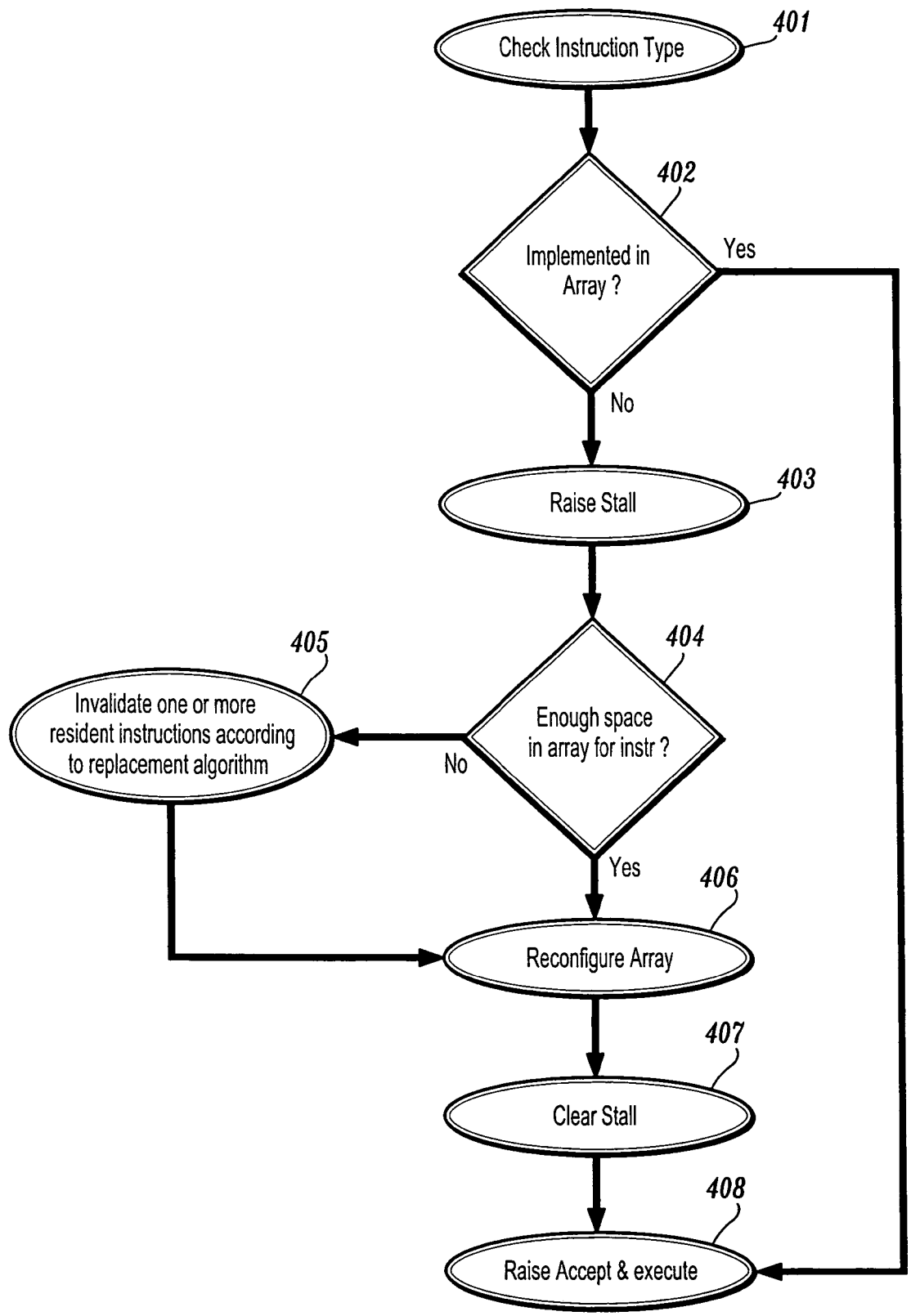
FIG. 4 depicts a flowchart illustrating the steps of a fast reconfiguration of the co-processor.
Figure 5:
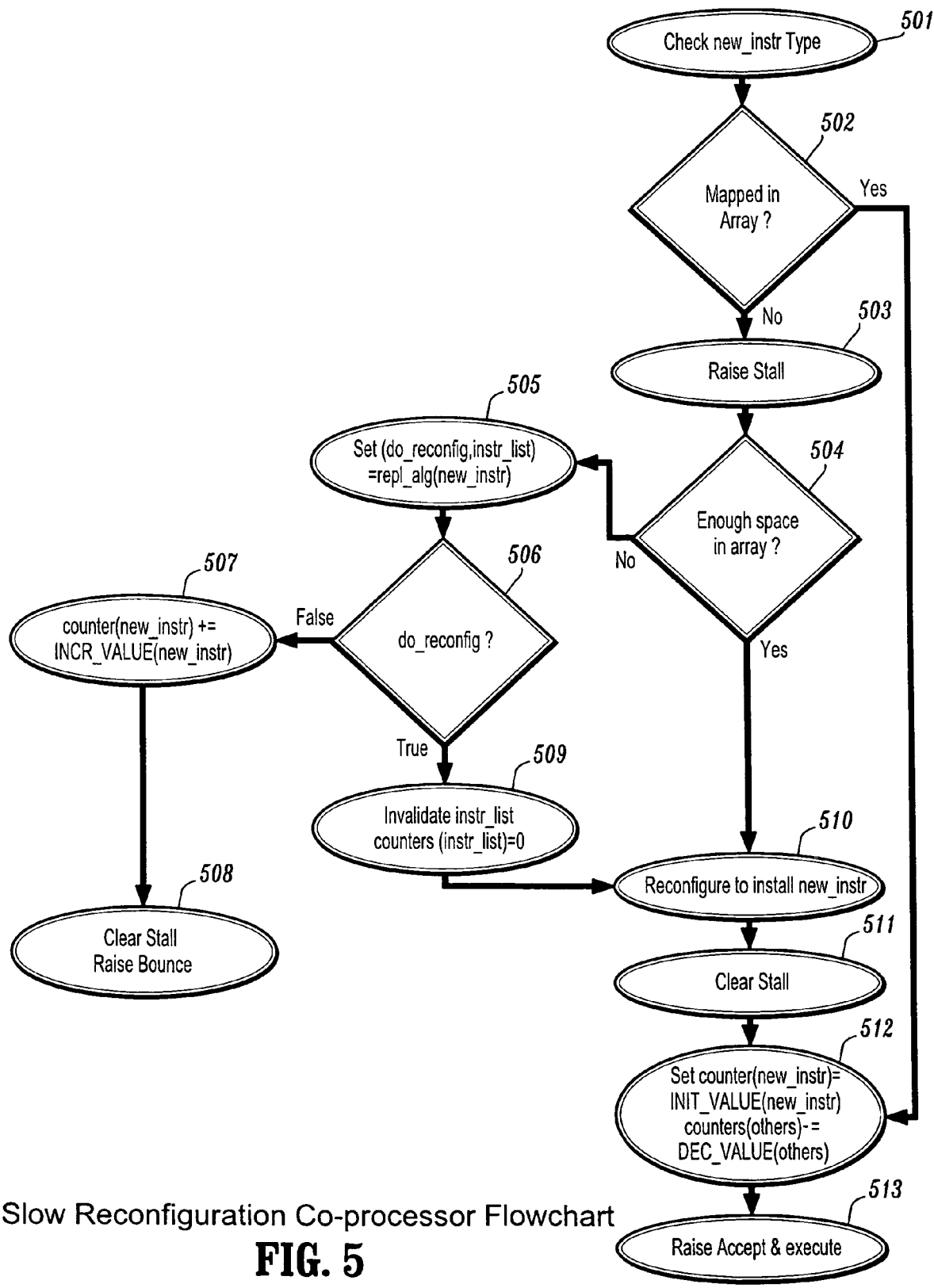
FIG. 5 depicts a flowchart illustrating the steps of a slow reconfiguration of the co-processor.

FIGS. 4 and 5 depict flowcharts that illustrate the steps involved in reconfiguring the co-processor. Some FPGA co-processors are designed so that reconfiguration can be performed quickly compared to the cycle time of the co-processor. The reconfiguration process depicted in FIG. 4 is applicable to these co-processors. For co-processors where the reconfiguration time can be several orders of magnitude slower than the cycle time, the reconfiguration process depicted in FIG. 5 is applicable. In this situation, the use of the performance counters to determine whether to trigger reconfiguration is appropriate.

Referring now to FIG. 4, beginning at step 401, a new instruction received by the co-processor is checked to determine if it has been mapped to the co-processor. If, at step 402, it is determined that the instruction has not been mapped, a stall signal is raised at step 403 in order to delay the main processor. A determination is made at step 404 as to whether there is enough space in the co-processor to map the instruction. If not, one or more resident instructions are invalidated at step 405, according to a replacement algorithm, presented below. At step 406, the co-processor is reconfigured to include the new instruction. Finally, the stall signal is cleared at step 407, the accept signal is raised at step 408, and the new instruction is executed by the co-processor.

A pseudo-code implementation of the replacement algorithm is as follows.

```
do_reconfig = FALSE;
FOR EACH mapping OF new_instr {
    value = 0;
    instr_list = empty_list;
    FOR EACH tile OF mapping {
        current_instr = instruction occupying tile;
        IF (current_instr NOT IN instr_list) {
            insert current_instr into instr_list;
            value += perf_counter(current_instr);
        }
    }
    if (perf_counter(new_instr) > value) {
        do_reconfig = TRUE;
        BREAK;
    }
}
```

In this implementation, new_instr is the instruction that is issued to the co-processor but is not mapped to the array. The algorithm produces two outputs: (1) do_reconfig, which if true, causes reconfiguration to be triggered to map new_instr; and (2) instr_list, a list of currently mapped instructions to be invalidated if reconfiguration occurs.

Referring now to FIG. 5, beginning at step 501, a new instruction received by the co-processor is checked to determine if it has been mapped to the co-processor. If, at step 502, it is determined that the instruction has not been mapped, a stall signal is raised at step 503 in order to delay the main processor. A determination is made at step 504 as to whether there is enough space in the co-processor to map the instruction. If there is sufficient space to map the instruction, the co-processor is reconfigured to include the new instruction at step 510. The stall signal is then cleared at step 511, and at step 512, the counter for the newly mapped instruction is reinitialized and the counters for the remaining instructions are decremented. Finally, the accept signal is raised at step 513, and the new instruction is executed by the co-processor.

If, however, it is determined at step 504 that there is insufficient space to map the new instruction into the array, the replacement algorithm is invoked at step 505. If, at step 506, do_reconfig returned by the algorithm is true, the instructions in instr_list are removed from the array at step 509, and their respective counters are set to zero. The process returns to step 510, where the new instruction is mapped to the array, as discussed in the preceding paragraph. On the other hand, if do_reconfig is determined to be false at step 506, the counter for the new instruction is incremented at step 507, and at step 508, the stall signal is cleared and the bounce signal is raised. In this situation, the new instruction can be emulated in software by the main processor, while the co-processor is reconfigured to include the new instruction for the next time it is issued to the co-processor.

While the present invention has been described in detail with reference to the preferred embodiments, those skilled in the art will appreciate that various modifications and substitutions can be made thereto without departing from the spirit and scope of the invention as set forth in the appended claims.

What is claimed is:

1. A method for adaptive runtime reconfiguration of a co-processor instruction set, in a computer system with at least a main processor communicatively connected to at least one reconfigurable co-processor, wherein the co-processor has been configured to implement an instruction set comprising one or more co-processor instructions, the method comprising the steps of:

issuing a co-processor instruction to the co-processor;
determining whether the instruction is mapped to the co-processor;
measuring the occurrence of the co-processor instruction, wherein measuring the occurrence of the co-processor instruction comprises the steps of:
providing the co-processor instruction with a performance counter;
initializing said performance counter when said co-processor instruction is issued to the co-processor;
incrementing said performance counter when a co-processor miss occurs;
decrementing said performance counter when a different co-processor instruction is issued to the co-processor instruction; and
zeroing said performance counter when said co-processor instruction is removed from the co-processor;
for an instruction not mapped to a co-processor instruction set, evaluating the need for reconfiguring the co-processor by comparing an occurrence of an unmapped instruction to that of one or more mapped instruction;

triggering reconfiguration of the co-processor instruction set when the performance counter of the unmapped instruction exceeds that of a mapped instruction, wherein said mapped instructions occupies a greater number of tiles in said co-processor than said unmapped instruction, wherein said unmapped instruction is added to the co-processor instruction set; and executing the newly added co-processor instruction.

* * * * *

UNITED STATES PATENT AND TRADEMARK OFFICE
CERTIFICATE OF CORRECTION

PATENT NO. : 7,523,449 B2
APPLICATION NO. : 11/508714
DATED : April 21, 2009
INVENTOR(S) : Sameh W. Asaad and Richard Gerard Hofmann It is certified that error appears in the above-identified patent and that said Letters Patent is hereby corrected as shown below:

On the Title Page, Item (63)
In the Related U.S. Application Data,
"Continuation of application No. 10/881,147" should be corrected to read
"Continuation of application No. 10/881,146".

In Col. 1, line 10, "U.S. patent application Ser. No. 10/881,147" should be corrected to read
"U.S. patent application Ser. No. 10/881,146".

Signed and Sealed this

Sixteenth Day of June, 2009

JOHN DOLL
*Acting Director of the United States Patent and Trademark Office*